United States Patent [19]

Sharp et al.

[11] 4,122,585
[45] Oct. 31, 1978

[54] SINGLE-ACTION DOUBLE-LOCK SNAP

[76] Inventors: Jonathan E. Sharp, 3999 Hillside Dr., Littleton, Colo. 80123; Frank R. Ross, 1371 Holly St., Denver, Colo. 80220

[21] Appl. No.: 816,447

[22] Filed: Jul. 18, 1977

[51] Int. Cl.² .............................................. A44B 13/02
[52] U.S. Cl. ............................ 24/241 SB; 24/241 PP
[58] Field of Search ...................... 24/241 SB, 241 PP

[56] References Cited

U.S. PATENT DOCUMENTS

| | | | |
|---|---|---|---|
| 1,521,811 | 1/1925 | Hartbauer | 24/241 SB |
| 1,879,168 | 9/1932 | Freysinger | 24/241 SB |
| 1,949,608 | 3/1934 | Johnson | 24/241 SB |
| 3,126,603 | 3/1964 | Cedarstaff | 24/241 SB |

FOREIGN PATENT DOCUMENTS 68,692   3/1949   Denmark .............................. 24/241 SB

*Primary Examiner*—Bernard A. Gelak
*Attorney, Agent, or Firm*—Frank C. Lowe; Horace B. Van Valkenburgh

[57] ABSTRACT

The invention is a single-action double-lock snap, a snap hook having a lock arm. The hook includes a shank with a hook at one end of the shank. The other end of the snap is connected to a cable or a lanyard and in use, the hook is connected to an anchor eye or the like. To avoid accidental disengagement of the hook from the anchor eye, a lock arm, or gate, is pivoted on the shank of the hook to reach across the throat of the hook to engage the point of the hook. This lock arm will thus normally lock the hook upon an anchor eye. However, the possibility exists that the hook can be accidentally opened to release the hook from the anchor eye whenever the snap is swung about while connected to the anchor eye. A detent is pivotally mounted upon the shank to bear against a seat on the lock arm whenever the lock arm is extended to close the throat of the hook. When the detent is so seated, the lock arm cannot be opened. The detent may be swung to an out-of-the-way position against the hook shank to free the lock arm and permit it to open. A spring interconnects the detent with the lock arm in such a manner as to pull the detent to its seat to secure the lock arm in its locking position. A wing on the detent, arranged for easy pushing by an operator's thumb or finger, permits the detent to be manually pushed away from its seat against the pull of the spring while at the same time, the spring pulls the lock arm to its open position against the shank.

3 Claims, 4 Drawing Figures

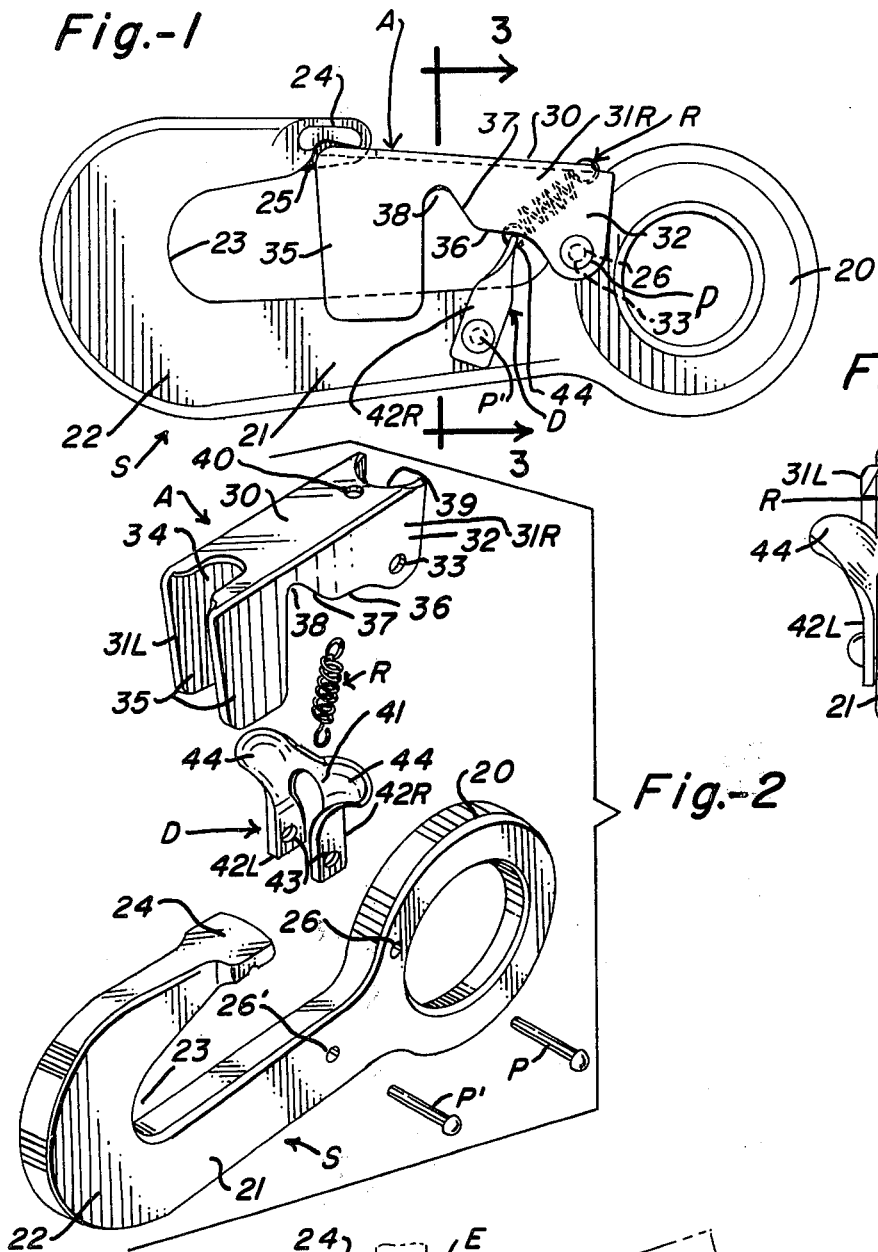
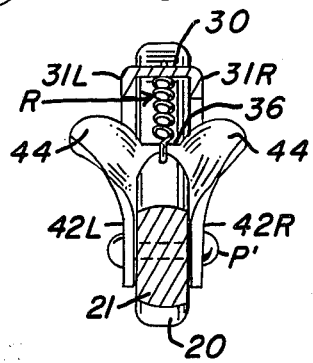
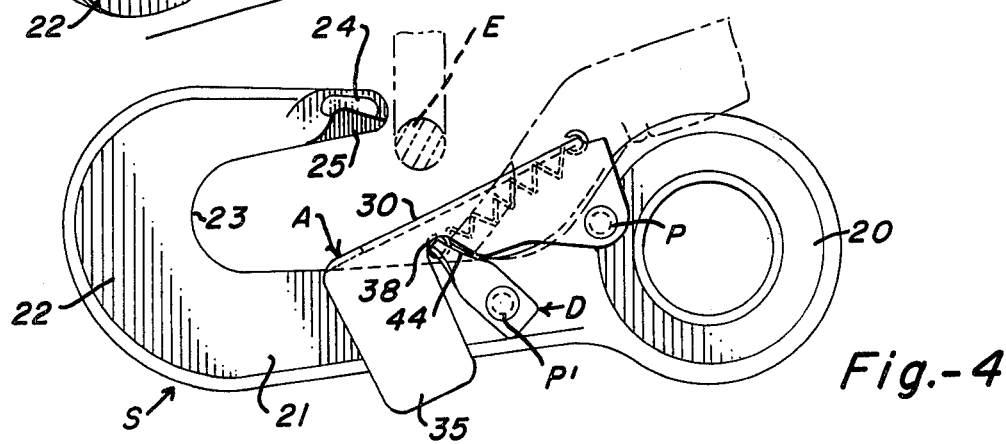

SINGLE-ACTION DOUBLE-LOCK SNAP

This invention relates to hooks commonly called snaps which are attached to hoist cables, lanyards or the like to engage the cables or lanyards to an anchor eye or D-ring. Such snaps are often provided with locks to prevent their accidental disengagement from the anchor eyes. The present invention relates more particularly to an improved double-locking lock for a snap and will be herinafter called "a single-action double-lock snap", and also simply a "dougle-lock snap".

The lock for a snap consists of an arm which is pivoted to the shank of the snap opposite the hook portion and is spring loaded to resiliently swing from the shank and normally reach across the throat of the hook to engage the point of the hook. This lock arm permits the snap to be easily connected to an anchor eye by swinging across the throat of the snap hook and against the shank thereof, but prevents a release, as by the snap falling away from the anchor eye when the cable or lanyard holding the snap is slack. With the lock arm bearing against the hook point of the snap, the snap cannot normally be disengaged from an anchor eye.

However, it was discovered that by twisting the snap to various positions upon an anchor eye, the lock arm could be depressed and the snap released. This can occur when the hoist cable or lanyard holding the snap is relaxed and loosely swinging to various positions about the anchor eye. A release of this sort is a serious hazard, especially in safety equipment and it is to be avoided. Accordingly, supplementary lock mechanisms have been developed to lock the lock arm when it is in place across the throat of the hook. Snaps with supplementary lock mechanisms are commonly called double-lock snaps. The supplementary lock mechanisms are sometimes called "detents".

Two operations are necessary to connect, or disconnect, a conventional double-lock snap from an anchor eye. First, the detent must be depressed or otherwise actuated to unlock the lock arm, and then the lock arm must be swung against the shank to open the hook throat. The necessity for applying two operations to open the lock arm of the double-lock snap has made this type of snap objectionable by many, even though it is a safer snap. The inconvenience of performing two operations can sometimes be serious, especially if an anchor eye is above a scaffold at a hard-to-reach location. It follows that there is a real and definite need for an improved double-lock snap which is easier to operate and which affords the advantages of safety without the inconveniences associated therewith. While some types of double-lock snaps have been proposed to simplify the locking and releasing actions, none have proven entirely satisfactory.

The present invention was conceived and developed with the foregoing considerations in view, and the invention comprises, in essence, an improved single-action double-lock snap wherein the lock arm and the detent are interconnected by a single spring to urge both components to their locking positions. The detent carries a finger tab for pressing to unlock it and, at the same time, to move the lock arm to its open position. This desirable simultaneous double-function is accomplished by using a detent formed as an arm pivotally carried upon the shank underneath the lock arm and connecting and cooperating with the lock arm by rotating with the lock arm to move both components against the hook shank when the snap is opened, the spring resiliently urging both components to locked position with the detent camming the lock arm in its locking position when released.

It follows that an object of the present invention is to provide a novel and improved single-action double-lock snap which effectively combines a lock arm and its control detent into a functionally integrated mechanism to simplify the operation of the snap.

Another object of the invention is to provide a novel and improved single-action double-lock snap requiring a single movement to both release the detent and to open the lock arm thereof, in an arrangement which permits the snap to be held in one hand in a natural manner, as it would be held, for attaching it to an anchor eye if no lock mechanism existed, and then, while so holding it, to open the lock by a simple thumb motion without changing the grip on the snap.

Another object of the invention is to provide a novel and improved single-action double-lock snap which operates so easily and so naturally that it can be used where double-lock snaps were formely objected to.

Other objects of the invention are to provide a novel and improved single-action double-lock snap which: is simple and sturdy in its basic construction, is essentially foolproof in operation yet may be operated with a minimum of instruction, and is a neat appearing, low cost unit.

With the foregoing and other objects in view, our invention comprises certain constructions, combinations and arrangements of parts and elements as hereinafter described, defined in the appended claims, and illustrated in preferred embodiment by the accompanying drawing, in which:

FIG. 1 is a side view of a snap having the improved single-action double-lock mechanism mounted thereon.

FIG. 2 is a perspective exploded view of the snap and of the several components constituting the double-lock mechanism.

FIG. 3 is a sectional view as taken from the indicated line 3—3 at FIG. 1.

FIG. 4 is a side view similar to FIG. 1 but with the snap open, and showing an individual's thumb and an anchor eye in broken lines to illustrate a mode of using the snap.

Referring first to FIG. 2 of the drawing, the improved single-action double-lock snap includes six components, the snap S, the lock arm A, the detent D, a spring R and two pivot pins P and P'. Each will be described as follows:

The snap hook S is shown as a typical, flat unit of a type commonly used on safety equipment. It is normally made of forged steel to attain maximum strength for its size. One common size for such a snap hook is a length of about 4 inches, a width of about 1½ inches and a thickness of about ⅜ inch. A connector eye 20, which may be about 1 inch in diameter, is formed at one end of a shank 21. The eye 20 is for attachment with a cable or lanyard. The shank 21 has a width several times its thickness and extends from the eye 20 to turn into a hook 22 at the opposite end. The hook 22 has a maximum width at its crotch 23, and this width decreases to a minimum at the hook point 24. The gap between the hook point 24 and the shank 21 defines the throat of the hook or snap hook whereacross the lock arm A reaches.

To adapt this hook for the lock arm A and detent D, the hook point 24 is flared and notched at each side of its inner edge to provide an infacing central nub 25 to better engage the end of the lock arm, as will be described. Also, pivot holes 26 and 26' are provided in the shank 21 to carry the pins P and P' which, in turn, carry the lock arm A and the detent D, respectively, as will be described. The pivot hole 26 is conveniently located opposite the hook point 24 where the shank 21 merges with the connector eye 20. The pivot hole 26' is located on the shank 21 nearer the hook 22. It is to be recognized that, if a snap hook is formed in a different manner from the type illustrated, the location of these pivot holes may be changed to properly position the lock arm A and the detent D upon the shank 21.

The lock arm A is a U-shaped member, such as may be formed by folding a flat metal sheet to produce a flat central ridge 30 and skirts 31R and 31L at each side of the ridge. The width of the ridge 30 is the same as the snap thickness, so that the skirts can embrace the snap shank 21. Each skirt at the base end of the arm is enlarged to form a pivot head 32. A pivot hole 33 is in this head to register with the pivot hole 26 in the snap hook to receive the pivot pin P and attach the lock arm A to the snap hook. The length of the lock arm A is such that the ridge 30 reaches to the point 24 of the hook, and a notch 34 at the end of this ridge 30 engages with the nub 25 to better hold the lock arm in place when in its locking position. At this position, the ridge 30 forms a flat angle with respect to the hook shank and swings against the hook shank when opened, as shown at FIG. 4.

The organization thus far described is conventional (excepting for the pivot hole 26'). In the improved single-action double-lock snap, the skirts 31R and 31L are modified. The end of each skirt opposite to the pivot head 32 is formed as an extended finger 35 to embrace the snap shank 21 opposite to the hook point 24 and close off the throat of the hook when the arm A engages the point of the hook. The intermediate portion of each skirt, 31R and 31L, is formed to define a seat 36 adjacent to the pivot head 32 and a cam surface 37 adjacent to the finger 35. The cam surface commences from pocket 38 at the base of the finger close to the ridge 30 and slopes thence to the seat 36. To complete this lock arm A, the end of the ridge 30 adjacent to the pivot head 32 is notched, as at 39, to better fit against the edge of the connector eye 20 and a hole 40 is provided in the ridge 30 adjacent to this notch 39 to receive an end of the spring R.

The detent D is also a U-shaped member, such as may be formed by folding and twisting a flat U-shaped blank of sheet metal to produce a flat head 41 with legs 42R and 42L, twisted to lie in spaced parallelism at a width such as to embrace the hook shank 21. A hole 43 in each leg 42 registers with the pivot hole 26' to permit the detent D to be pivotally mounted upon the shank 21 by the pivot pin P'. So mounted, the head 41 extends transversely across the snap and under the lock arm A to engage the edges of the arm skirts 31R and 31L. Thus, the detent D may rotate towards the connector eye 20, with the edge of the head 41 engaging the seat 36 when the lock arm A is closed against the hook point 24, as shown at FIG. 1. The detent D may also rotate towards the hook 22 with the edge of the head 41 extending into the pocket 38 when the lock arm A is swung against the shank to its open position, as shown at FIG. 4.

The flat head 41 of the detent is narrowed at its center to facilitate connecting the spring R in place between the skirts 31 of the lock arm A. Also, this head is wider than the lock arm A to provide an extension ear 44 at each side thereof, for gripping to push the detent from the seat 36 to the pocket 38, as by an operator's thumb, indicated in broken lines at FIG. 5.

Movement of the lock arm responsive to movement of the detent is effected by interconnecting them with the spring R. One end of the spring R is connected to the hole 40 of the lock arm A and the other end is connected to the narrow center of the detent head 41. The spring, under tension, urges the detent towards the seat 36 and unrestricted movement of the detent D from the open position, FIG. 4, to the locked position, FIG. 1, is along the cam surface 37 to the seat 36, locking the arm A in the closed, double-locking position. To open the arm from the locked position, the detent is pushed toward the hook, as by thumb pressure on an ear 44 and, as the detent moves off the cam 36 and to the pocket 38, the spring pull urges the lock arm to its open position.

The use of the unit is apparent from the foregoing description. The snap hook may be gripped by one hand, by holding it at the connector eye 20 with the individual's thumb against an extension ear 44 of the detent. Pressure on the ear rotates the detent against the shank 21 and, at the same time, pulls the lock arm to its open position with the head 41 of the detent moving into pocket 38. The snap may be fastened on an anchor eye E. Releasing the pressure on the ear 44 permits the spring to return the detent to the seat 36 and as it moves up the cam surface, the lock arm is forced to the closed, locking position.

We have now described our invention in considerable detail. However, it is obvious that others skilled in the art can build and devise alternate and equivalent constructions which are, nevertheless, within the spirit and scope of my invention. Hence, we desire that our protection be limited, not by the constructions illustrated and described, but only by the proper scope of the appended claims.

What is claimed is:

1. In a single-action, double-lock snap, of the type combining a snap hook including a shank portion and a hook at one end thereof, with a throat portion between the point of the hook and the shank; and a lock arm having a laterally offset pivot head at one end of the arm overlying the shank at the end portion opposite to the hook and being connected thereto by a lock arm pivot with the opposite end of the lock arm being swingable across the throat portion to engage the hook point to close the snap and to lie adjacent to the shank to open the snap, the improvement comprising:

(a) a detent pivotally mounted on the shank between the hook and the lock arm pivot to extend laterally to engage the lock arm and to swing towards the hook and towards the lock arm pivot;

(b) a cam surface on a side of the lock arm engaged by the detent having a seat portion adjacent to the lock arm pivot head and a pocket adjacent to the hook, whereby to lock the lock arm in engagement with the point of the hook to close the snap when the detent is swung towards the lock arm pivot and onto the seat portion and to permit the lock arm to lie adjacent to the shank to open the snap when the detent is swung towards the hook and into the pocket; and (c) a spring tensioned between the detent and to the lock arm adjacent to the laterally offset pivot head whereby the spring normally pulls the detent towards the lock arm pivot and onto the cam seat portion to hold the snap closed and whereas pressure against the detent to swing the detent towards the hook pulls the spring to swing the lock arm against the shank to open the snap.

2. In the snap defined in claim 1 wherein the lock arm and the detent are formed as folded, U-shaped members with the sides of each respective member overlapping the sides of the shank.

3. The snap defined in claim 2, wherein the detent includes:

ears projecting from each side thereof to facilitate gripping the detent to facilitate manually shifting it from the snap-closing position to the snap-opening position.

* * * * *